United States Patent [19]
Hayakawa et al.

[11] 3,934,186
[45] Jan. 20, 1976

[54] PROGRAM CONTROL SYSTEM FOR ROBOTS FOR INDUSTRIAL USE

[75] Inventors: Kyohei Hayakawa; Hiroshi Maeda, both of Nagoya, Japan

[73] Assignee: Mitsubishi Jukogyo Kabushiki Kaisha, Japan

[22] Filed: Oct. 19, 1973

[21] Appl. No.: 407,909

Related U.S. Application Data

[63] Continuation-in-part of Ser. No. 232,441, March 7, 1972, abandoned.

[52] U.S. Cl. ............... 318/567; 318/569; 318/162; 318/568; 318/604; 340/172.5
[51] Int. Cl.² .................. G05B 19/10; G05B 19/30; G05B 19/18
[58] Field of Search .......... 318/567, 569, 162, 568, 318/604; 340/172.5

[56] References Cited
UNITED STATES PATENTS

| | | | |
|---|---|---|---|
| 3,317,894 | 5/1967 | Jensen | 318/569 |
| 3,525,082 | 8/1970 | Jensen | 340/172.5 |
| 3,754,124 | 8/1973 | Dressler | 318/567 |
| 3,845,284 | 10/1974 | Taguchi et al. | 235/150.1 |

*Primary Examiner*—James R. Scott
*Assistant Examiner*—John J. Feldhaus
*Attorney, Agent, or Firm*—Toren, McGeady and Stanger

[57] ABSTRACT

A program control unit for industrial robots comprising programming means to check instructions from arm-position memory means in which the arm motions are set by means of an arm-position selecting circuit and generates arm-position setting signals and also instruction signals for the grip and the exterior through an instruction signal converter circuit, and a stepping circuit to which are led quick-feed or jumping instructions as well as instructions based on actual arm-position signals, grip and exterior motion signals, and confirmation signals from the programming means, so that the programming means can be allowed to proceed with the processes by said stepping circuit.

6 Claims, 8 Drawing Figures

3,934,186

PROGRAM CONTROL SYSTEM FOR ROBOTS FOR INDUSTRIAL USE

CROSS-REFERENCE TO PRIOR APPLICATION

This is a continuation-in-part application of Ser. No. 232,441 now abandoned filed Mar. 7, 1972.

This invention relates to a control system for robots for industrial use, and more specifically to improvements of a program control system for such robots.

Conventional program control systems for industrial robots have the following disadvantages:

1. In positioning an arm of the robot a timer is used but the operation is not checked afterwards. Consequently there is a danger of an erroneous operation breaking the positioning mechanism.
2. Gripping is partly checked. However, it is checked by simply stopping the motion temporarily. Because the conventional systems are unable to evaluate the results and switch over to another motion according to the conditions, their applications are limited.
3. Where programs partly in common for individual steps are to be used, they are planned in the order of process, that is, two or more idential programs have to be prepared. Thus the overall volume of the programs is increased to such an extent that the capacity limit of one system is reached too soon.

SUMMARY OF THE INVENTION

It is a principal object of the invention to provide industrial robots which operate with the same program capacity and the same system as conventional robots but are capable of performing more functions in a safer way.

Advantages of the industrial robots according to this invention are as follows:

a. When a robot has to be stopped for positioning, its motion is checked. When the robot is partly in operation and has only to bypass a certain range for the purpose of positioning, it may be operated with a timer to move as if under a continuous series of instructions while it is actually moving under point-to-point instructions.
b. External conditions given can be judged and, on the basis of the judgment, the robot can be so instructed as to proceed to some other motion.
c. Common programs are consolidated into one and the program is planned once for all. As a result, a comprehensive program covering an accordingly increased variety of instructions can be prepared.

Thus the control system according to the present invention gives instructions on arm positions, grip and exterior motions, and checks and makes certain that the robot has functioned in conformity with those instructions, and then issues following instructions.

The present invention will be more fully described hereunder with reference to the accompanying drawing showing a preferred embodiment thereof.

BRIEF DESCRIPTION OF THE DRAWINGS

Such description makes reference to the annexed drawings wherein.

Figure 1:
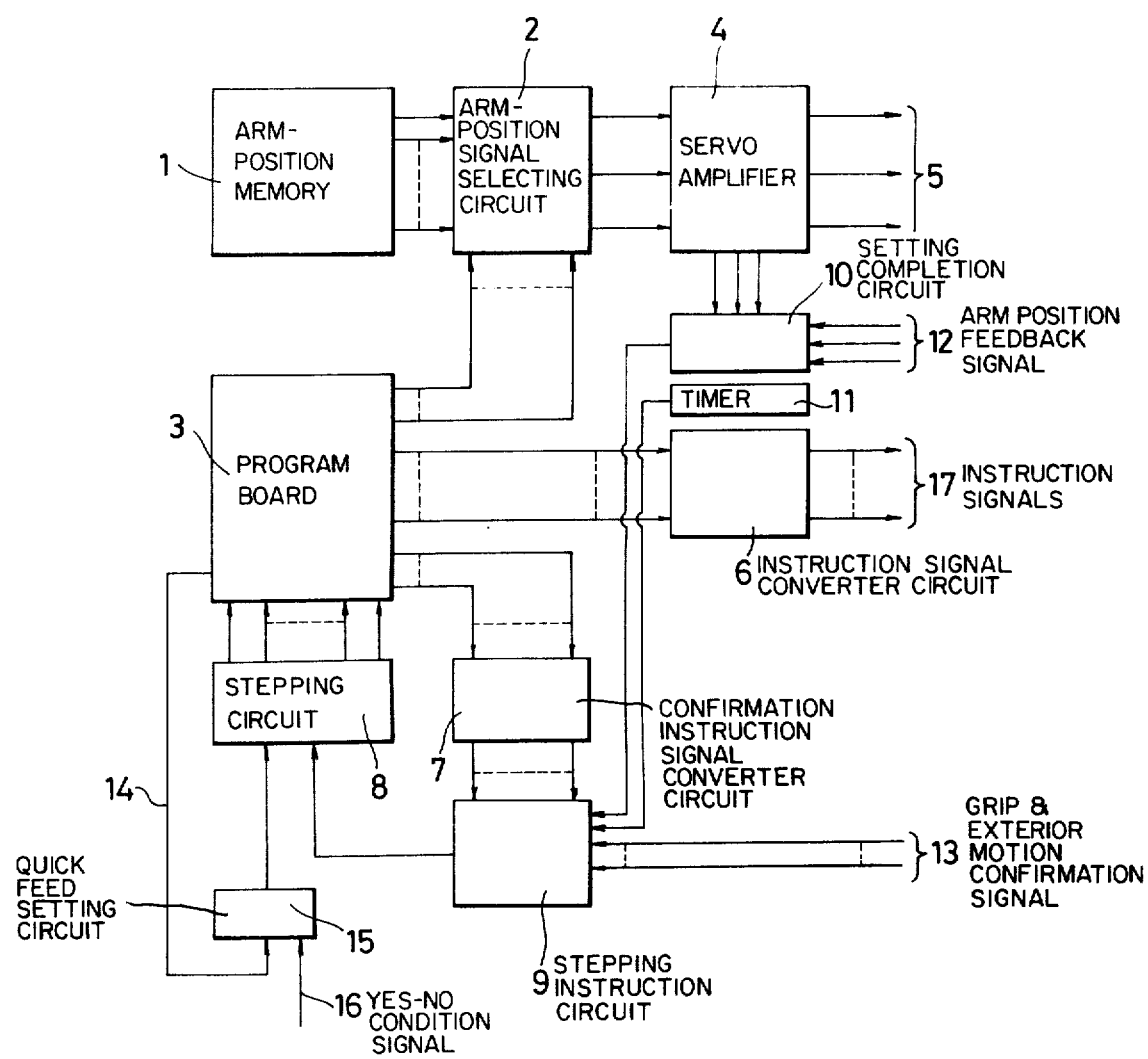
FIG. 1 is a diagrammatic representation of a control system according to the invention.

DESCRIPTION OF THE INVENTION i. Positions which a robot has to assume in going through a step are set in an arm-position memory 1 as shown in FIG. 1, and they are connected to an arm-position signal selecting circuit 2 with a plurality of wires indicated by a dotted line. A program covering the entire motions of the robot and the exterior is incorporated in a program board 3. In response to instructions from the board 3, the selecting circuit 2 selects signals from the arm-position memory 1 and transmits the selected signals to servo-amplifier 4, which in turn generates signals 5 for an electric-hydraulic servo-system to set the arm position.

ii. As the program board 3 a programming pinboard is used. (At each pinned point longitudinal and lateral lines contact crosswise. If the operation proceeds from process to process transversely, only the pinned columns for each process give instructions in the longitudinal direction.) A stepping circuit 8 for the progress of process comprises ring counters which correspond to the respective columns of the program board 3.

iii. Instruction signals 17 for the grip and the exterior are generated by passing the signals (on→off) from the program board 3 directly through an instruction-signal converter circuit 6 in accordance with the program set in the program board 3.

iv. As the operation proceeds from one step to another following the testing of the instructions, the signals (on→off) from the program board 3 are directly given to a stepping instruction circuit 9 by way of a confirmation instruction signal converter circuit 7 in accordance with the program set in the program board 3.

v. The arm position is given from the arm in terms of a feedback signal 12 for the servo-system. When the signal is compared and found to agree with the input signal, it is then introduced from a setting completion circuit 10 into the stepping instruction circuit 9 as one of the command conditions for stepping. In the foregoing description the wires indicated by dotted lines represent plural lines required between the individual circuits.

vi. When the arm position is to be confirmed as in (v) above, the arm is once stopped in that position. If it need not be stopped, a program may be prepared in the program board 3 in such a way that the arm can proceed to the next step after having moved only a period of time (as set by a timer 11) sufficient for bypassing any obstacle which may be present on its path.

vii. A grip and exterior motion confirmation signal 13 is given to the stepping instruction circuit 9 as one of the conditions for stepping for each instruction.

viii. When any one and same program is to be repeatedly used in a single step, a quick-feed program is set beforehand in the program board 3. In this way its output signal 14 is given to a quick-feed setting circuit 15, and the program output of the latter is given to the stepping circuit 8. The state of the stepping circuit 8 is thereby changed, and the ring counters perform jumping as accordingly designated.

ix. Where a "yes" or "no" instruction given to a certain process necessitates a change in the following process, a yes-no condition signal 16 is given to the quick-feed setting circuit 15. A program thereby set is given to the stepping circuit 8 and the state of the latter circuit is changed, thus causing the ring counters to perform jumping as accordingly designated.

Figure 2:
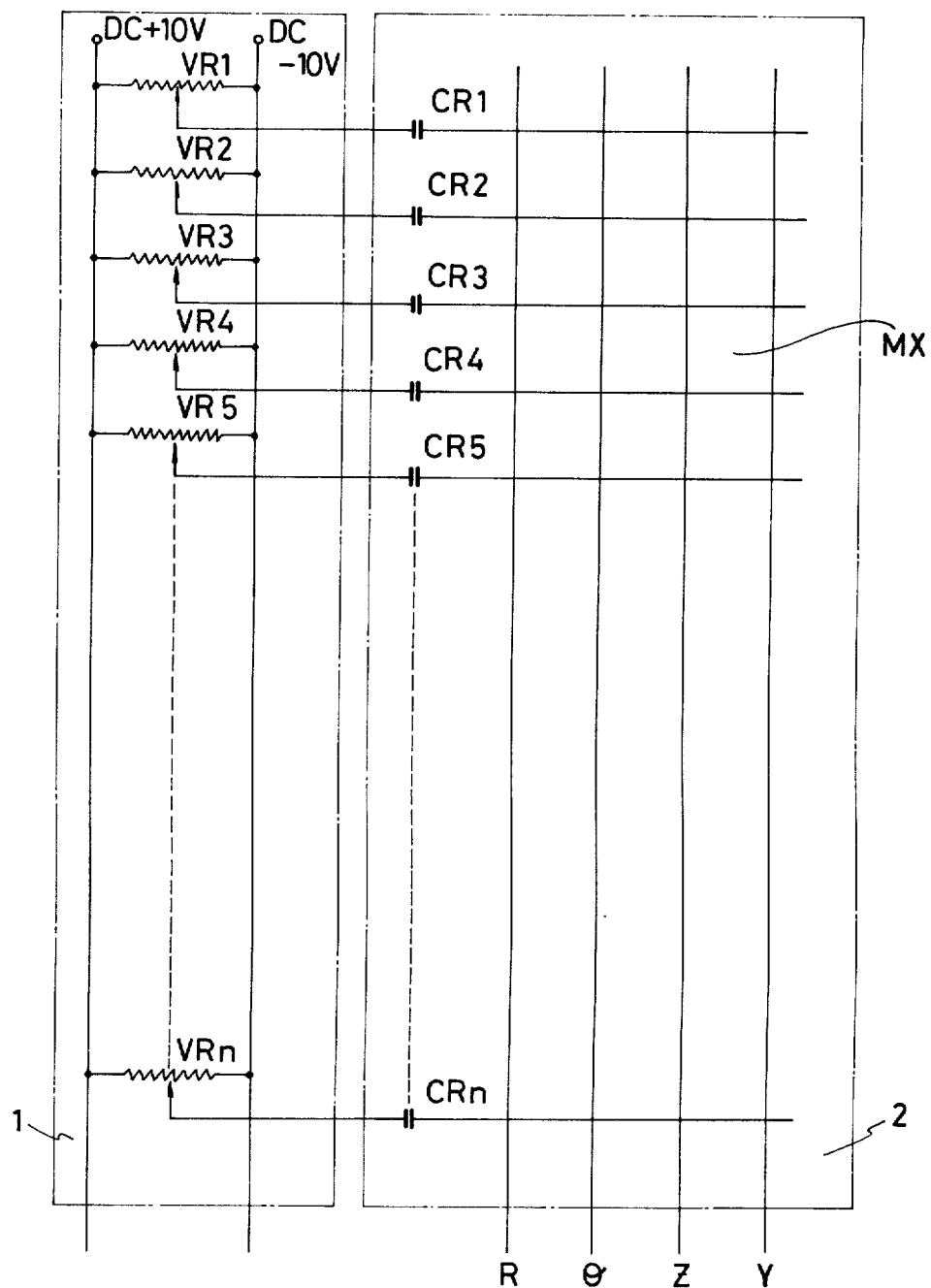
FIG. 2 illustrates the second embodiment of this invention that is concerned with arm-position memory connected to the arm-position signal selecting circuit incorporated in the program control system of this invention as illustrated in FIG. 1.

FIG. 2 illustrates the second embodiment of this invention that is concerned with arm-position memory 1 connected to arm-position signal selecting circuit 2 incorporated in the program control system of this invention as illustrated in FIG. 1. In said Fig., VR1, VR2, . . . , VR$n$ represent variable resistors connected in parallel to the DC power supply, respectively. Voltages set at respective variable resistors, VR1, VR2, . . . , VR$n$, are conveyed to arm-position selecting circuit 2. If short pins are fitted into adequate lattice points on matrix MX comprising arm-position signal selecting circuit 2, voltages set at variable resistors, VR1, VR2, . . . , VR$n$, can be transmitted through relay contacts, CR1$a$, CR2$a$, . . . , CR$n a$, to lines, R, $\theta$, Z, Y.

Figure 3:
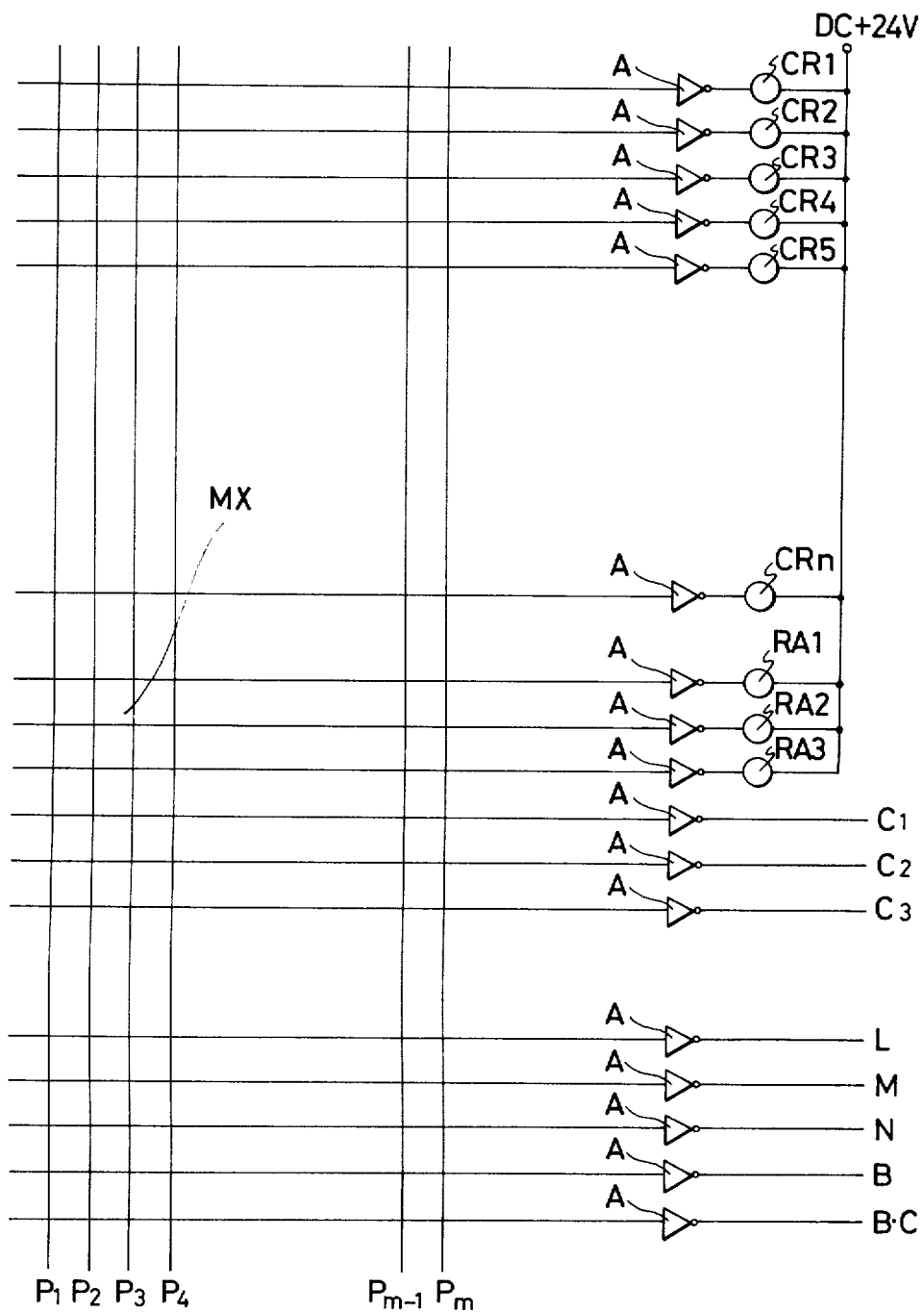
FIG. 3 illustrates a program board comprising matrix as illustrated in FIG. 1.
Figure 7:
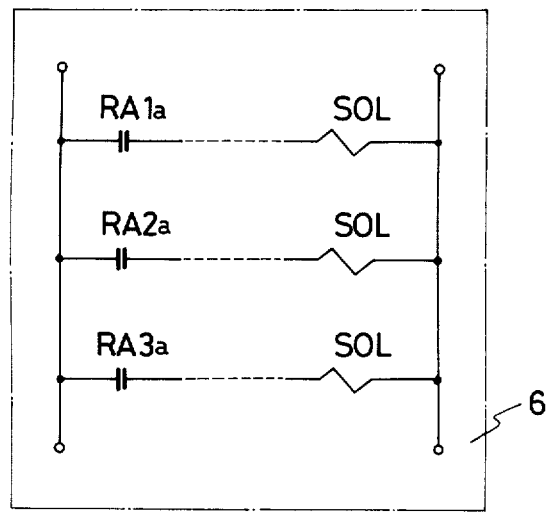
FIG. 7 illustrates instruction-signal converter circuit as illustrated in FIG. 1.
Figure 8:
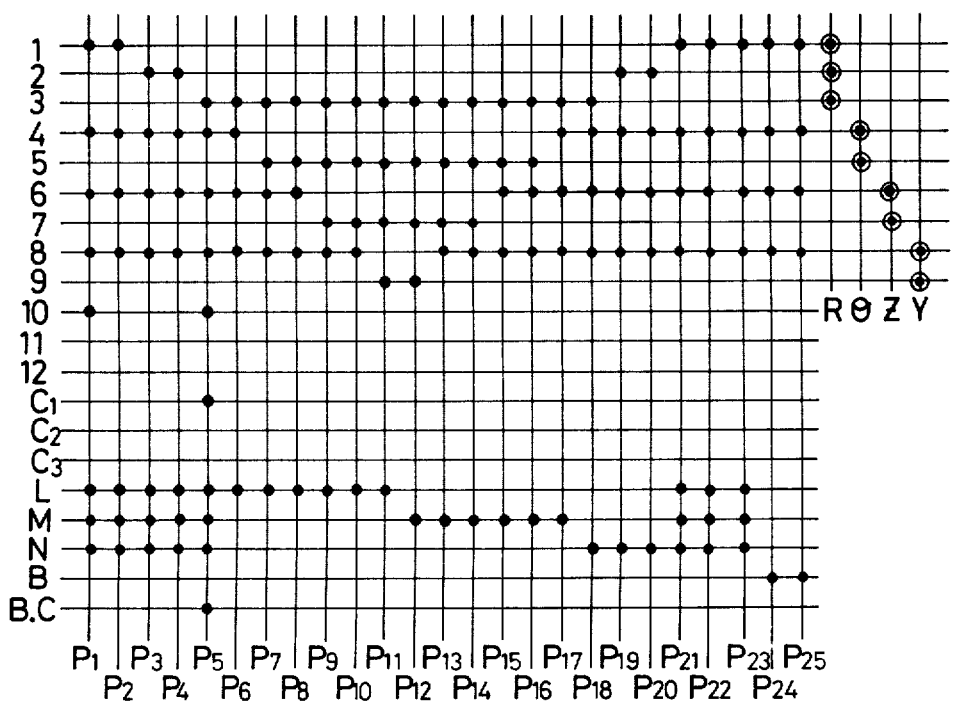
FIG. 8 illustrates an example of programming of this invention.

FIG. 3 illustrates program board 3 comprising matrix MX. If diode pins are fitted in at adequate lattice points of such matrix MX, a plurality of relays, CR1, CR2, . . . , CR$n$, and RA1, RA2, RA3, can be driven at arbitrary steps, respectively. Thus in the example of programming as illustrated in FIG. 8, line P$_1$ is fitted with diode pins at 1st, 4th, 6th, 8th, 10th rows simultaneously to excite, among the relays shown in FIG. 3, relays, CR1, CR4, CR6, CR8, RA1, and therefore in FIG. 2 voltages of variable resistors, VR1, VR4, VR6, VR8, are transmitted to lines, R, $\theta$, Z, Y, through said relay contacts, CR1$a$, CR4$a$, CR6$a$, CR8$a$, respectively, while in FIG. 7 lead solenoid SOL is driven by closing the contact of relay RA1$a$.

The circuit operates similarly for other lines, P2, P3, . . . .

Figure 4:
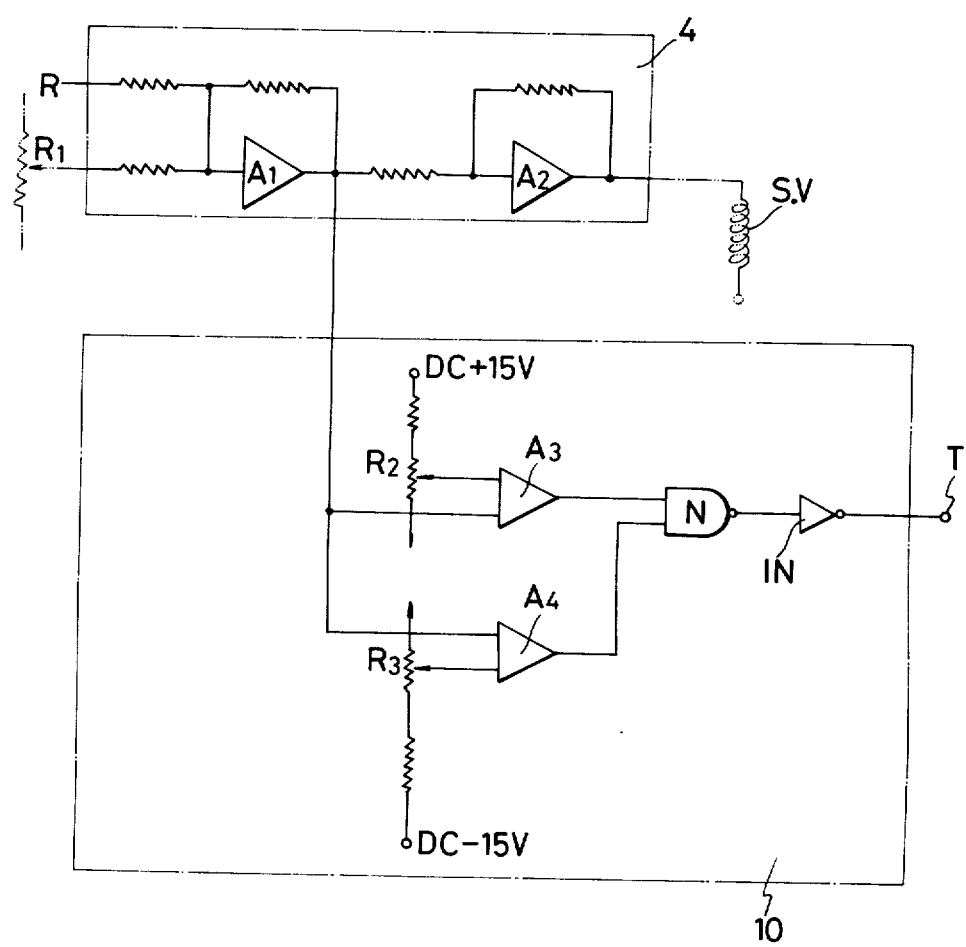
FIG. 4 illustrates a servo-amplifier and setting completion circuit as illustrated in FIG. 1.

Voltages transmitted from variable resistors, VR1, VR2, . . . , VR$n$ to lines, R, $\theta$, Z, Y are applied to the inputs of servo-amplifiers 4 as shown in FIG. 4. Servo-amplifier 4 consists of servo-amplifiers A$_1$ and A$_2$ of the same type in cascade connection. FIG. 4 is given specifically for the input from line R, but circuits of the same type are provided for the inputs from other lines $\theta$, Z, Y. Voltage applied to line R is amplified by amplifiers A$_1$ and A$_2$ to drive servo-valve S.V. Feedback output signal from position detector R$_3$ that is attached to the machine driven by said servo-valve and voltage applied to line R are added in said amplifier A$_1$. When the output voltage from said amplifier reaches within the limits adjusted beforehand by position detectors R$_2$ and R$_3$ that are involved in setting completion circuit 10 comprising a comparator, the signal that indicates setting completion is produced at terminal T as the comparator output. Said setting completion circuit 10 consists of amplifiers A$_3$ and A$_4$ connected to outputs of detectors R$_2$ and R$_3$ and to input stage of NAND circuit N that is followed by inverter IN.

If diode pins are fitted into adequate lattice points on matrix MX, signals appear at output lines C$_1$, C$_2$, C$_3$ shown in FIG. 3. In FIG. 3, A represented either of amplifier and relay driver. Logical product of signals appearing on said output lines C$_1$, C$_2$, C$_3$, external input signals, for example from limit switches, applied to terminals EX$_1$, EX$_2$, EX$_3$ in FIG. 5, and comparator output on said terminal T is formed to appear at terminal S.T as the shift signals.

Figure 5:
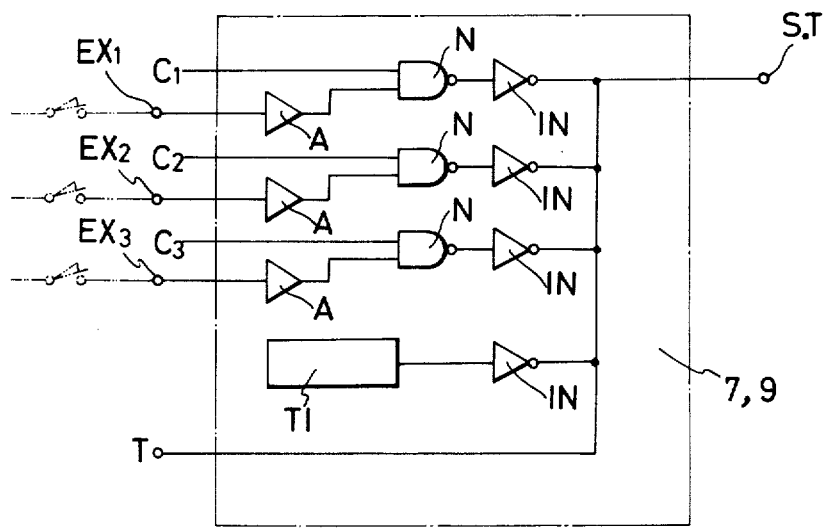
FIG. 5 illustrates a confirmation instruction signal inverter circuit and stepping instruction circuit as illustrated in FIG. 1.

Circuits shown in FIG. 5 correspond to confirmation instruction signal inverter circuit 7 and stepping instruction circuit 9. In said Fig., outputs of amplifiers A's, the inputs of which are connected to input terminals EX$_1$, EX$_2$, EX$_3$ from exterior and outputs on output lines C$_1$, C$_2$, C$_3$ are applied to respective NAND circuits N's followed by inverters to produce the shift signal at output terminal S.T. In said Fig. TI denotes the timer.

Said shift signal is transmitted to stepping circuit 8 and quick-feed setting circuit 15. Stepping circuit 8 consists of delay circuit 18 comprising timer TI and NAND circuit N, differentiation pulse generator 19 comprising two inverters IN's, flip-flop F.F and NAND circuit N, and mod-m counter 20 with output connected to said program board 3. On the other hand, quick-feed setting circuit 15 consists of program switching circuit 21 comprising two flip-flops in cascade connection provided with NAND circuit N and inverter IN at the output stage thereof, pin insertion detector 22 comprising inverters IN's connected to respective lines L, M, N, B receiving quick-feed output signals 14 from said program board 3, NAND circuits provided, respectively, at the output stages of said inverters, and inverter IN, NAND circuit N, and inverter IN in cascade connection commonly provided at the outputs of said NAND circuits corresponding to lines L, M, N, and program identification circuit 23 comprising NAND circuit N, inverter IN and flip-flop F.F.

Figure 6:
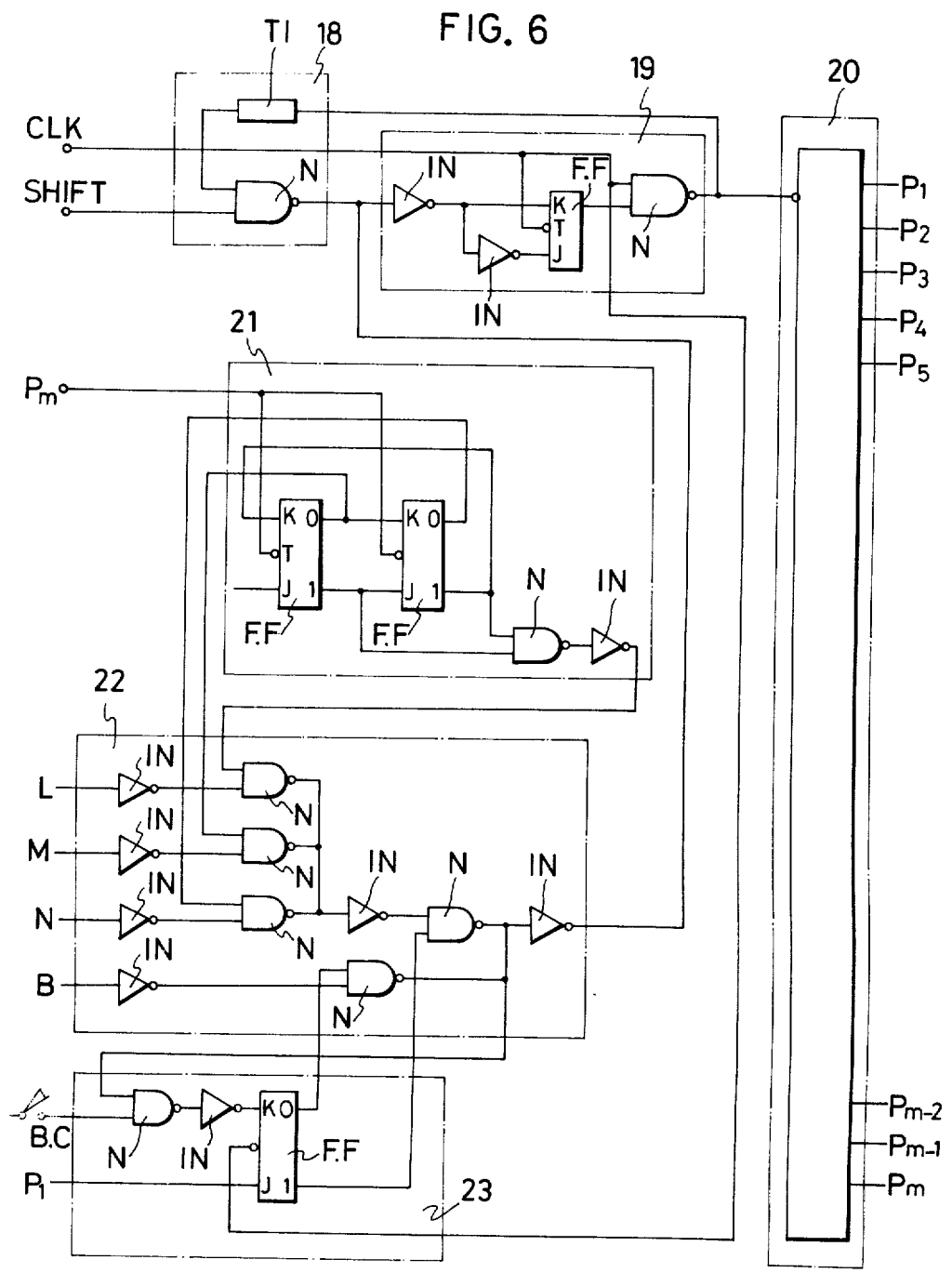
FIG. 6 illustrates a stepping circuit and quick-feed setting circuit as illustrated in FIG. 1.

With line L assigned to the program by program switching circuit 21 in the circuit diagram of FIG. 6, if the diode pin is inserted into row L, the shift signal is effectively transmitted to differentiation pulse generator 19, so that the next differentiation pulse is generated only after a lapse of fixed time because of the operation of delay circuit 18. On the contrary, with no insertion of the diode pin the shift signal becomes ineffective and terminal K of flip-flop F.F involved in differentiation pulse generator 19 is set at "H" level to produce the clock signal. Said clock signal gives a quick stepping operation (quick-feed) to mod-m counter 20 till next step when another diode is inserted in row L.

Program switching circuit 21 assigns program M for operation as soon as the last step signal for row L is transmitted to P$_m$. Thus the series of programs L, M, N can be repeated. As a matter of course, the assignment of more programs can be performed similarly.

In program identification circuit 23 the input signal from exterior inverts flip-flop F.F, if the specific condition is satisfied, and makes the shift signal effective only when the diode pin is inserted in the line leading to terminal B in program board 3. In particular, the output signal B.C of FIG. 3 is put into a known AND gate, together with any exterior input signal to be generated by a limit switch etc., provided outside so that the output of said AND gate can be supplied through a suitable amplifier to the signal B.C terminal of FIG. 6. In this manner, it is possible to confirm the presence or absence of the exterior input signal. For example, in the program as shown in FIG. 8, a diode pin is inserted in B.C line of P5 so that when the output signal B.C of FIG. 3 and the exterior input signal happen to occur at the same time, the flip-flop F.F of the program identification circuit 23 is sure to change state until the program P24, P25 of B line, with insertion of a diode pin, can be performed.

A flip-flop (not shown) is connected to program board 3 or $P_1$ terminal of m-step counter 20 and can be reset by a single step.

As mentioned above, mod-m counter 20 can provide the quick-feed, step-feed and condition identification operations.

We now see the principles of operation in the program control system for the industrial robot embodied from this invention by referring to an example of programming as illustrated in FIG. 8.

In FIG. 8, rows 1 to 9 are provided for programming for operation instructions to be given to arm-position signal selection circuit 2: rows 10 to 12 for programming for output signals to drive external devices: rows $C_1$, $C_2$, $C_3$ for programming for setting required conditions to the inputs from external devices: rows L, M, N for setting the program: BC to give the program identification condition.

In other words rows B and BC are provided for the branch program and the assignment of branch condition, respectively. In the program shown in FIG. 8, the program proceeds in the order L → M → N → L, as mentioned above, according to the switching operations of program switching circuit 21, so that the instructions are assigned by program board 3 in reference to $P_1$ to $P_{11}$, $P_{21}$ to $P_{23}$ ($P_{12}$ to $P_{20}$, $P_{24}$, $P_{25}$ correspond to quick-feed) for row L, $P_1$ to $P_5$, $P_{12}$ to $P_{17}$, $P_{21}$ to $P_{23}$ ($P_6$ to $P_{11}$, $P_{18}$ to $P_{20}$, $P_{24}$, $P_{25}$ correspond to quick-feed) for row M, and $P_1$ to $P_5$, $P_{18}$ to $P_{23}$ ($P_6$ to $P_{17}$, $P_{24}$, $P_{25}$ correspond to quick-feed) for row N.

On the other hand, when the required conditions to the inputs from exterior are satisfied at step $P_5$, namely, when the exterior input due to the limit switch, etc., is imparted to B.C. terminal of FIG. 6 at the same time with signal B.C. of FIG. 3, instructions become effective for row B in relation to columns with diode pin insertion on the same row. Therefore, for program B the instructions are $P_{24}$, $P_{25}$ ($P_6$ to $P_{23}$ correspond to quick-feed).

It is noted that in the aforementioned programs L, M, N, lines $P_1$ to $P_5$ and $P_{21}$ to $P_{23}$ are common so that there is no need for repeating the programming in this regard. In the above-mentioned quick feed mechanism, there is a significant difference in the stepping speed under ordinary conditions and the quick stepping speed in quick-feed operation so the program signal relative to the quick-feed operation will also be transmitted under such conditions. In other words, the jump-instruction signal as it is, will provide some influence or other on the outside. Therefore, for example, the above mentioned inconvenience can be easily prevented by employing a known AND gate at each program output and flip-flop F.F. output in the program identification circuit 23 of FIG. 6, as will be understood, for blocking any unwanted external influence.

As will be obvious from the foregoing detailed description, the control system of the present invention is practically advantageous because: (1) it can proceed from one motion process to another after having confirmed the entire motion including the arm positioning; (2) where the confirmation of motion is not required or where the robot is to proceed to another motion after a certain period of time, the program can be planned accordingly in advance; (3) when a single process involves the same motion to be performed twice or more, only one such motion has to be programmed and the rest is omitted by giving a "jump" instruction to the stepping circuit. In this manner the motions of one process alone are programmed; and (4) a program can be prepared by which the conditions given are evaluated and on the basis of the evaluation another motion is performed.

We claim:

1. A program control system for use with an industrial robot having an arm for performing predetermined manipulations, said arm capable of grip control and said robot also capable of motion external to said arm, said system comprising:

memory means for determining arm position;

pin-board type means for programming the sequence of operations for said robot;

arm-position selecting means responsive to said memory means and programming means for supplying preselected servo control signals;

servo means responsive to said servo control signals for moving said arm, feedback signals being generated by said arm in response thereto;

comparator means responsive to feedback signals from said arm for detecting coincidence with said memory means;

means responsive to said programming means for generating arm grip and exterior motion instruction signals, grip and exterior motion confirmation signals being received from said robot in response thereto;

means responsive to said grip and exterior motion confirmation signals and to said comparator means and programming means for confirming that confirmation signals and comparator means output come within predetermined limits;

stepping means responsive to said confirmation means for advancing the programming means from one step to another; and means for detecting those positions of said pinboard memory with inserted pins and those without pins, said stepping means for performing normal stepping operations corresponding to pin-inserted positions, and including jumping means for jumping positions without pin insertion.

2. The program control system of claim 1, wherein said stepping means includes a ring counter.

3. The system of claim 1, wherein operations which are repeated are programmed in said programming means only once and said jumping means permits predetermined jumping to said repeated operation, said jumping being provided by means for quick-feeding the stepping means at a substantially higher rate than during normal operation.

4. The program control system of claim 1, also including a program identification means for detecting the presence of the prior selected specific input condition of the programming step assigned to the programming means, and a pin insertion detector for detecting the positions with pin insertion in the programming means for programs assigned by said program identification means.

5. A program control system for use with an industrial robot having an arm for performing predetermined manipulations, said arm capable of grip control and said robot also capable of motion external to said arm, said system comprising:
   memory means for determining arm position;
   pinboard type means for programming the sequence of operations for said robot;
   arm-position selecting means responsive to said memory means and programming means for supplying preselected servo control signals;
   servo means responsive to said servo control signals for moving said arm, feedback signals being generated by said arm in response thereto;
   comparator means responsive to feedback signals from said arm for detecting coincidence with said memory means;
   means responsive to said programming means for generating arm grip and exterior motion instruction signals, grip and exterior motion confirmation signals being received from said robot in response thereto;
   means responsive to said grip and exterior motion confirmation signals and to said comparator means and programming means for confirming that confirmation signals and comparator means output come within predetermined limits;
   stepping means responsive to said confirmation means for advancing the programming means from one step to another; and
   wherein said confirmation means includes a confirmation instruction signal converter and stepping instruction circuit, and said stepping means includes a differentiation pulse generator for differentiating step signals supplied by said confirmation instruction signal converter and stepping instruction circuit, a delay circuit and a counter for changing the condition of said programming means.

6. The program control system of claim 5, also including timing means and means responsive to said timing means for blocking said stepping means during a predetermined time period.

* * * * *